C. M. Osgood,
Pressing Hats.
No. 111,079.    Patented Jan. 17, 1871.
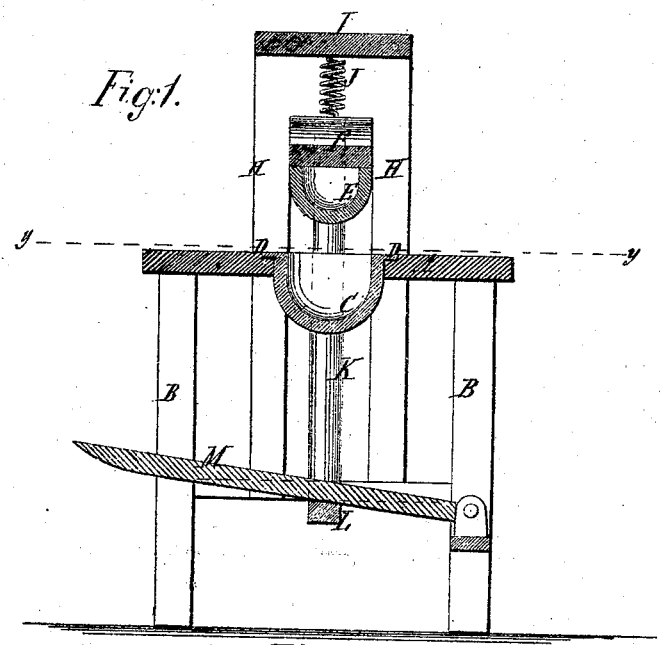
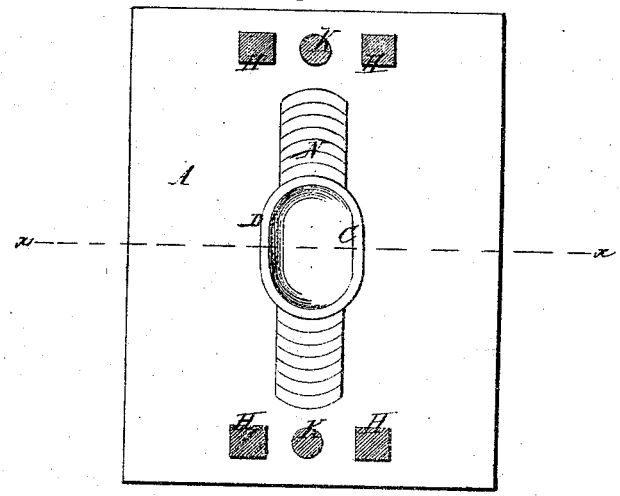
Witnesses
E. F. Kastenhuber
C. Wahlers
Inventor
Charles M. Osgood
By Van Santvoord & Stauff
his Atty

United States Patent Office.

CHARLES M. OSGOOD, OF AMHERST, MASSACHUSETTS, ASSIGNOR TO L. M. HILLS & SONS, OF NEW YORK CITY.

Letters Patent No. 111,079, dated January 17, 1871.

IMPROVEMENT IN HAT-MACHINES.

The Schedule referred to in these Letters Patent and making part of the same.

*To all whom it may concern:*

Be it known that I, CHARLES M. OSGOOD, of Amherst, in the county of Hampshire and State of Massachusetts, have invented an Improvement in Hat-Machines; and I do hereby declare the following to be a full, clear, and exact description, which will enable those skilled in the art to make and use the same, reference being had to the accompanying drawing forming part of this specification, in which drawing—

Figure 1 represents a vertical section of this invention, the line $x\,x$, fig. 2, indicating the plane of section.

Figure 2 is a horizontal section of the same taken in the plane indicated by the line $y\,y$, fig. 1.

Similar letters indicate corresponding parts.

This invention relates to a gauge for ascertaining the amount of material in the shells, so called, of hats previous to blocking and finishing them.

It consists in a table or platform, which contains a socket or cavity to receive the crown and scales or graduated marks formed on the table or platform, outside of the socket or cavity; and of a plunger, which serves to force the crown down into said cavity, so that the brim is either drawn in or forced out, according to the quantity of material contained in the crown; and by the scale on the table, the size to which the hat can be blocked will be ascertained with ease and facility.

The letter A designates the table or platform, which is supported upon suitable standards B.

In about the center of the table I make an opening to receive a removable socket, C, of metal or any suitable hard material, which I make with a flange, D, around its edge, so that it can be supported upon the edge of the opening in the table.

The socket C is oval in shape in this example, but can be made of any form that may be desired, and immediately above it I suspend a plunger or die, E, of like shape, and which I also make of metal or other suitable hard material.

The plunger is fastened to the under side of a sliding frame, F, by means of ears or flanges that project from the upper edge of the plunger, and it can, like the socket C, be removed in order to substitute other sizes, or for repair, as may be desired.

The sliding frame F is guided between standards H H, at the ends of the table, and the tops of these standards are secured in a cross-bar, I, to the under side of which is fastened one end of a spiral spring, J, whose other end is secured to the sliding frame in such a manner that the force of the spring is continually exerted to draw the frame with the plunger up clear of the socket C.

The sliding frame F is connected, by vertical rods K K, to a treadle-bar, L, over which extends a treadle, M, which works on a pivot arranged on the lower part of the frame of the table.

Upon the surface of the table A, I arrange a graduated scale, N, which commences at or near the socket C, and extends outward therefrom a sufficient distance to enable one to measure stock of the largest diameter.

In the present example I have made the scale upon metallic plates let into the surface of the table on each side of the largest diameter of the socket C, the lines of the scale being concentric with the adjacent edge of the socket or approximately so; but the scale can be made upon all sides of the socket, or confined to one side, as may be preferred, or, instead of consisting of curved lines, the scale can be made by placing marks in radial lines that extend outward from the socket.

The scale is marked with figures and fractions that denote the measurement of the diameter of the stock, or the extent to which its edges extend upon the table.

In operating the machine, I place a shell upon the table, with the convex side of its crown over the socket C, and then bring the plunger into it in such a manner as to force the crown into the socket, the plunger filling the crown more or less completely, and causing the brim part to take its proper place upon the table, so that the workman can see to what place upon the scale its edges extend, and be enabled thereby to assort the stock for the different blocks and sizes to which it will work.

If the crown contains an excess of material, such excess is forced out, and the brim extends further out on the scale; or if the crown contains a deficiency of material, the brim is drawn in on the scale, and the exact amount of material can thus be ascertained.

If desired, the socket and the plunger can be reversed without changing the result.

The spring might be replaced by a weight.

What I claim as new, and desire to secure by Letters Patent, is—

The graduated table A, in combination with the socket C and plunger or die E, substantially as above described.

CHARLES M. OSGOOD.

Witnesses:
W. A. DICKINSON,
WM. SLATTERY.